(12) United States Patent
Garner (10) Patent No.: US 9,713,298 B2
(45) Date of Patent: Jul. 25, 2017

(54) MULTI-CHANNEL AGRICULTURAL SINGULATING METER

(71) Applicant: Deere & Company, Moline, IL (US)

(72) Inventor: Elijah B. Garner, Bettendorf, IA (US)

(73) Assignee: Deer & Company, Moline, IL (US)

( * ) Notice: Subject to any disclaimer, the term of this patent is extended or adjusted under 35 U.S.C. 154(b) by 37 days.

(21) Appl. No.: 14/870,262

(22) Filed: Sep. 30, 2015

(65) Prior Publication Data

US 2017/0086358 A1 Mar. 30, 2017

(51) Int. Cl.
| | |
|---|---|
| *A01C 7/20* | (2006.01) |
| *A01C 7/04* | (2006.01) |
| *A01C 7/16* | (2006.01) |
| *A01C 5/06* | (2006.01) |
| *A01C 21/00* | (2006.01) |

(52) U.S. Cl.
CPC .............. *A01C 7/163* (2013.01); *A01C 5/062* (2013.01); *A01C 7/046* (2013.01); *A01C 7/206* (2013.01); *A01C 21/005* (2013.01)

(58) Field of Classification Search
CPC ......... A01C 7/082; A01C 7/088; A01C 7/122; A01C 7/18; A01C 7/206; A01C 21/005; A01C 7/121; A01C 5/062; A01C 7/046
See application file for complete search history.

(56) References Cited

U.S. PATENT DOCUMENTS

| | | | |
|---|---|---|---|
| 3,633,796 A | 1/1972 | Zweegers | |
| 3,848,552 A | 11/1974 | Bauman et al. | |
| 3,860,146 A | 1/1975 | Bauman et al. | |
| 4,522,291 A * | 6/1985 | Smick | A01C 7/206 111/150 |
| 6,986,314 B2 * | 1/2006 | Linnebur | A01C 5/062 111/152 |
| 8,869,717 B2 * | 10/2014 | Memory | A01C 5/062 111/152 |
| 9,010,258 B1 * | 4/2015 | Richard | A01C 7/044 111/179 |
| 9,148,992 B2 * | 10/2015 | Staeter | A01C 21/005 |
| 2003/0084829 A1 * | 5/2003 | Lempriere | A01C 7/006 111/50 |
| 2015/0289441 A1 * | 10/2015 | Arnett | A01C 7/046 111/185 |
| 2015/0351314 A1 * | 12/2015 | Sauder | A01C 7/046 700/275 |
| 2016/0295792 A1 * | 10/2016 | Secrest | A01C 21/005 |

FOREIGN PATENT DOCUMENTS

| | | | | |
|---|---|---|---|---|
| DE | EP 2974582 A1 * | 1/2016 | ............. | A01C 5/062 |
| DE | 102015101255 A1 * | 7/2016 | ............. | A01C 21/005 |
| DE | EP 3050418 A1 * | 8/2016 | ............. | A01C 7/046 |

OTHER PUBLICATIONS

"EDX precision airplanter details", retrieved at <http://www.amazone.net/1265.asp>, available on Jul. 30, 2015, 9 pages.

* cited by examiner

*Primary Examiner* — John G Weiss
(74) *Attorney, Agent, or Firm* — Christopher J. Volkmann; Kelly, Holt & Christenson, PLLC (57) ABSTRACT

An agricultural seeding machine comprises, in one example, a seed delivery system configured to deliver seeds to at least one trench by two or more substantially gravity-drop channels, and a seed metering system comprising a rotating meter element configured to singulate seeds from a seed source into the two or more channels.

19 Claims, 7 Drawing Sheets

MULTI-CHANNEL AGRICULTURAL SINGULATING METER

FIELD OF THE DESCRIPTION

The present description generally relates to agricultural seeding machines. More specifically, but not by limitation, the present description relates to singulating meters for singulating seed in an agricultural seeding machines.

BACKGROUND

One example agricultural machine is a planting machine that includes row units configured to plant seeds in a plurality of rows. Examples of planting machines include, but are not limited to, box drills, air seeders, and row crop planters. To maximize yield, the row units plant seeds in furrows or trenches with proper spacing and depth based on various features such as crop type and soil conditions. In one example, row units can be configured to push a blade, disk, or other trench opener through the soil to create a trench with a desired depth. Seed is metered to the trench by a singulating meter that singulates the seed and discharges individual seeds sequentially. Row units can also be configured to utilize a closing mechanism that follows the openers and pushes soil back into the opening, thereby filling the trench and covering the seeds.

In addition to planting seeds for crops, these example seeding machines can be similarly used to evenly distribute other agricultural material such as fertilizers and herbicides.

The discussion above is merely provided for general background information and is not intended to be used as an aid in determining the scope of the claimed subject matter.

SUMMARY

An agricultural seeding machine comprises, in one example, a seed delivery system configured to deliver seeds to at least one trench by two or more substantially gravity-drop channels, and a seed metering system comprising a rotating meter element configured to singulate seeds from a seed source into the two or more channels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
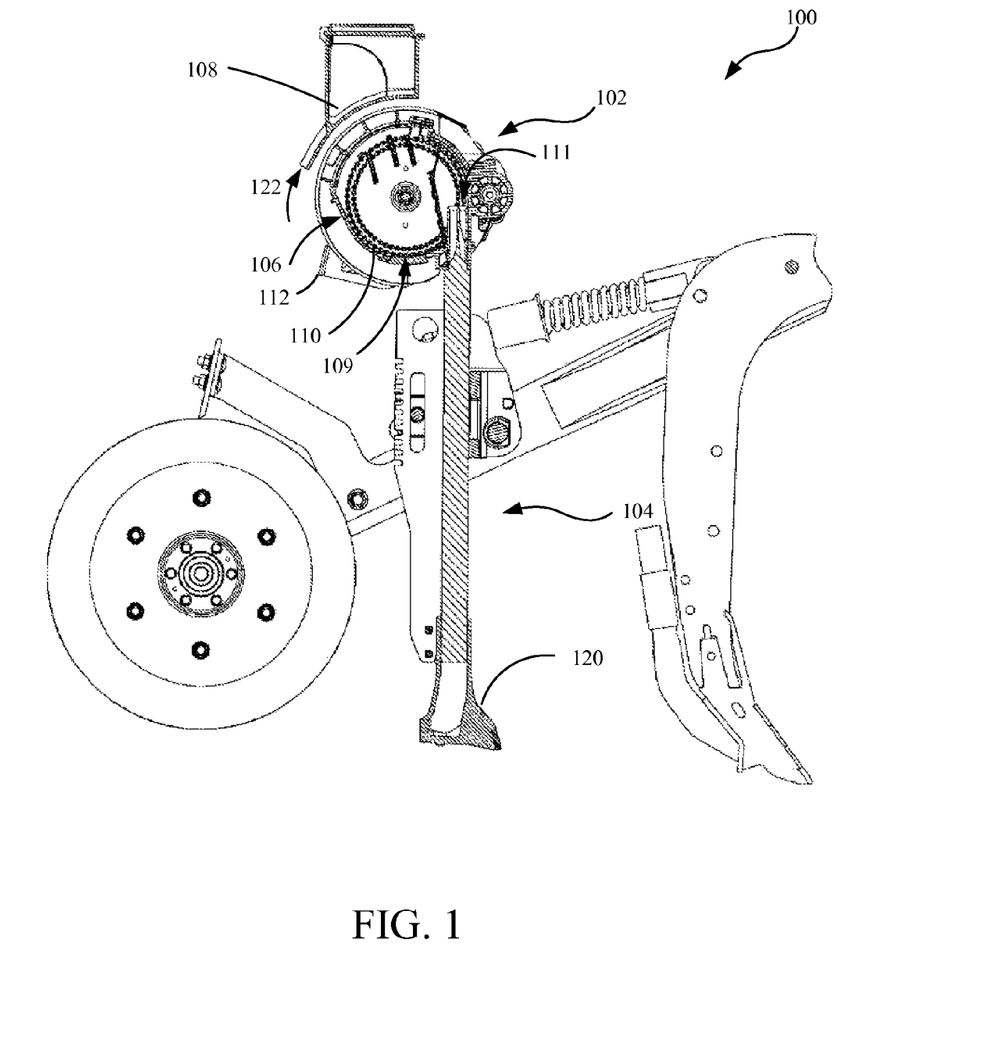
FIG. 1 illustrates one example of a tyne opener assembly for use on seeding equipment.

FIG. 1 illustrates one example of a tyne opener assembly 100 for use on seeding equipment. In FIG. 1, some components of assembly 100 have been omitted for sake of illustration. Typically, a tyne opener receive seed that has been volumetrically metered and conveyed pneumatically to the opener for depositing in the soil. The example assembly 100 shown in FIG. 1 is provided with a singulating seed metering system 102 that receives seed pneumatically and then singulates the seed at the row unit.

System 102 is configured to singulate seed into a plurality of separate delivery channels. As shown in FIG. 1, seed metering system 102 meters seed to a seed delivery system 104 using a rotating meter element 106 that is driven using any suitable drive mechanism (e.g., an electric motor, ground-engaging wheels, etc.). Meter element 106 comprises, in one example, a rotating drum. In the illustrated example, element 106 is substantially disk-shaped. For example, element 106 can comprise a generally concave body. In FIG. 1, element 106 is shown as a substantially flat disk.

Element 106 conveys seed from a seed source pickup location to a release location using sets of annular apertures or perforations 110 that are disposed generally about the periphery of the rotating meter element 106. In the example of FIG. 1, a seed source 108 provides a source of seed for a seed pool (generally represented by reference numeral 109). Element 106 is rotatably driven (by a motor or other element) in the direction indicated by arrow 122. As element 106 rotates, annular apertures 110 pickup seed from seed pool 109 and convey them to a release location (generally represented by reference numeral 111).

Seeds are retained in apertures 110 during the conveyance between the pickup and release locations using a pressure differential applied to element 106 using an air flow connection 112. In one example, the pressure differential comprises a positive pressure applied to one side of element 106. In the illustrated example, the pressure differential comprises a vacuum or negative pressure applied to one side of element 106. In either case, the seeds are held in apertures 110 by the pressure differential until the pressure differential is cutoff at the release location, which discharges the seed into seed delivery system 104.

Before describing FIG. 1 in further detail, it is noted that a pressure differential meter is illustrated and described for the sake of example. Other types of meters, such as mechanical meters, can be used to singulate seeds into multiple rows.

As illustrated in FIG. 1, seed delivery system 104 comprises a plurality of (i.e., two in the illustrated example) separate delivery channels to a delivery endpoint component 120 (e.g., one or more seed boot(s), paired row opener(s), etc.). The channels within seed delivery system 104 can be formed by one or more gravity drop components (e.g., one or more seed drop tubes) and/or mechanical assistance components (e.g., rotating brush belt(s), etc.). In one example, air can be used to assist conveyance of seed through seed delivery system 104.

In the example of FIG. 1, a plurality of substantially gravity drop channels are formed by one or more tubes. For example, two separate tubes can convey seed to a same trench, or to different trenches. In the illustrated example, a bifurcated tube is utilized to convey separate seed streams to component 120.

FIGS. 2-5 provide additional views of seed metering system 102, shown in FIG. 1.

Figure 2:
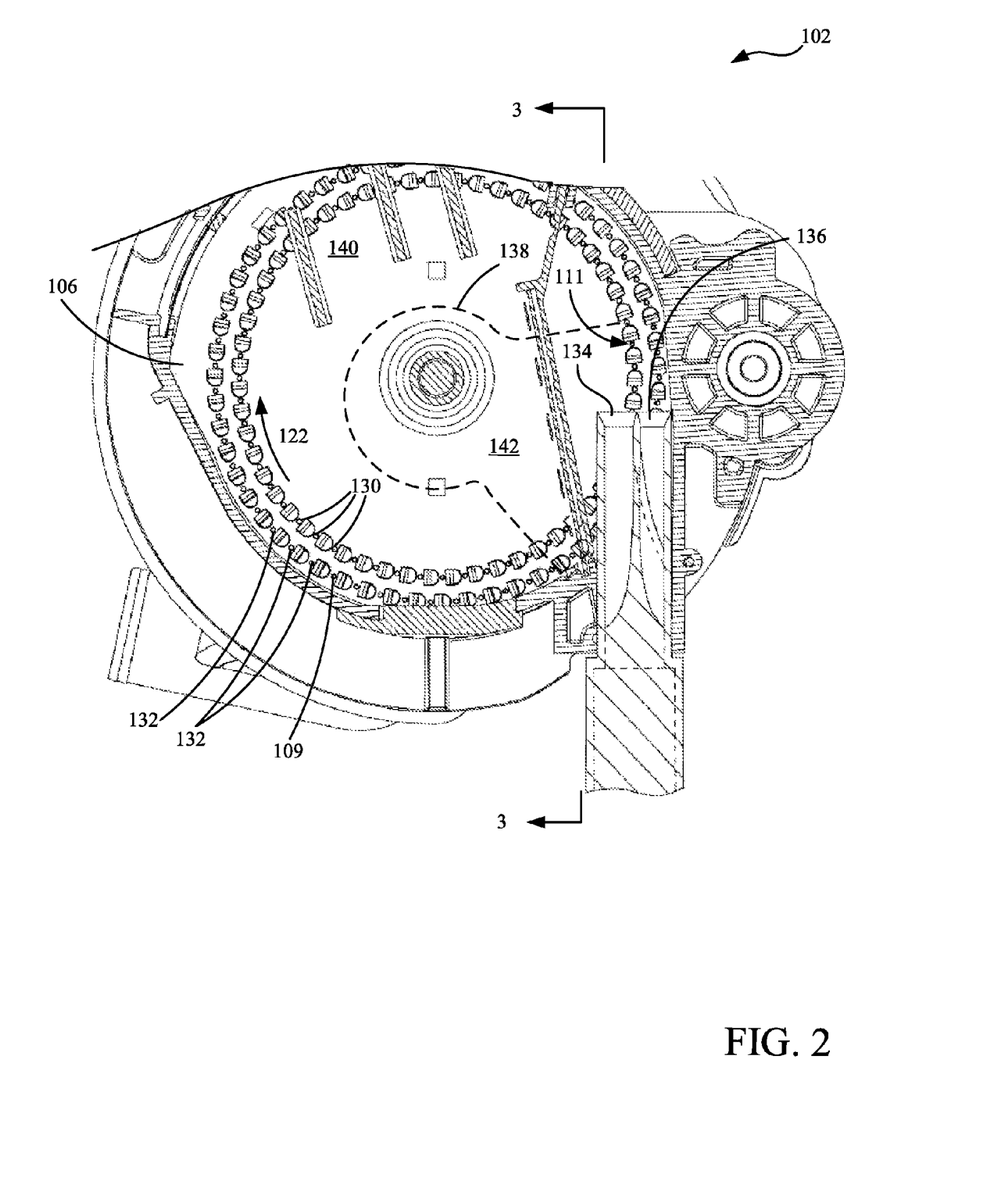
FIG. 2 is an enlarged view of the example seed metering system, shown in FIG. 1.

As shown in FIG. 2, which is an enlarged view of the seed metering system 102, rotating meter element 106 comprises a plurality of sets of annular apertures formed in element 106. As shown, the sets comprise a first, inner set of apertures 130 configured to singulate seed into a first one of the channels and a second, outer set of apertures 132 configured to singulate seed into a second one of the channels.

As element 106 rotates in direction 122, and due to the pressure differential across element 106, seeds are picked up from the seed pool at reference numeral 109 and conveyed along a conveyance path to the release location 111. In one example, a pressure barrier (represented by dashed line 138) is located on the side of element 106 to which the positive or negative pressure is applied. As such, once a seed is conveyed past barrier 138 at the release location 111, the pressure differential is removed from the seed along the seed to be released from the aperture, and into the respective channels. In other words, the pressure differential exists in region 140, and does not exist in region 142.

Figure 3:
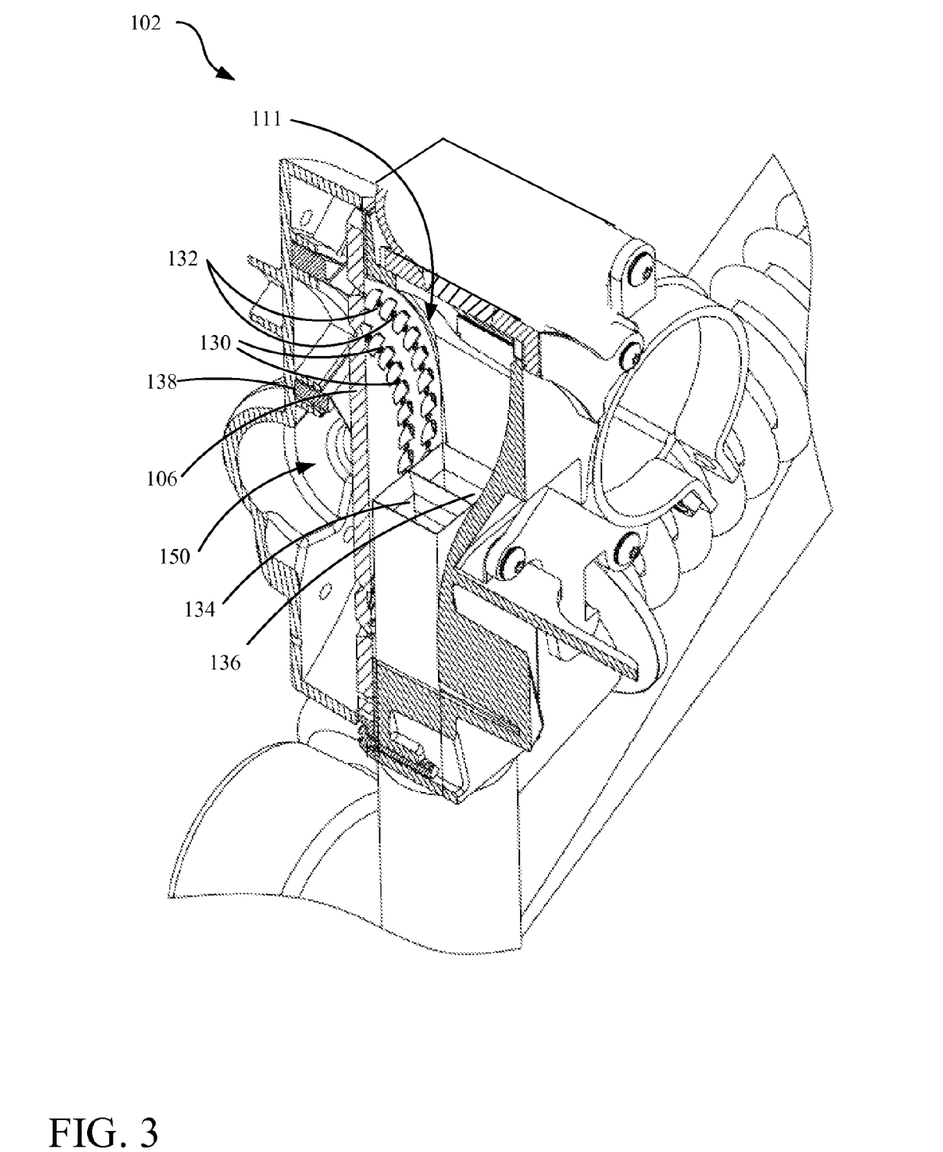
FIG. 3 is cross-section view of the seed metering system shown in FIG. 2, taken at line 3-3.

FIG. 3 is cross-section view of system 102 taken at line 3-3, shown in FIG. 2. As shown in FIG. 3, the negative pressure is applied to a first side 150 of element 106. Barrier 138 is disposed to cut off the pressure differential at the release location 111, such that seeds from apertures 130 are dropped into a first inlet opening 134 for a first channel and seeds from apertures 132 are dropped into a second inlet opening 136 for a second channel. Each channel provides a separate path to a seed row (as noted above, the seed rows can be in a same trench, or different trenches). As such, when seeds are released from element 106, they not only drop into separate channels, but the seeds remain separated through placement into the rows by component 120.

Figure 4:
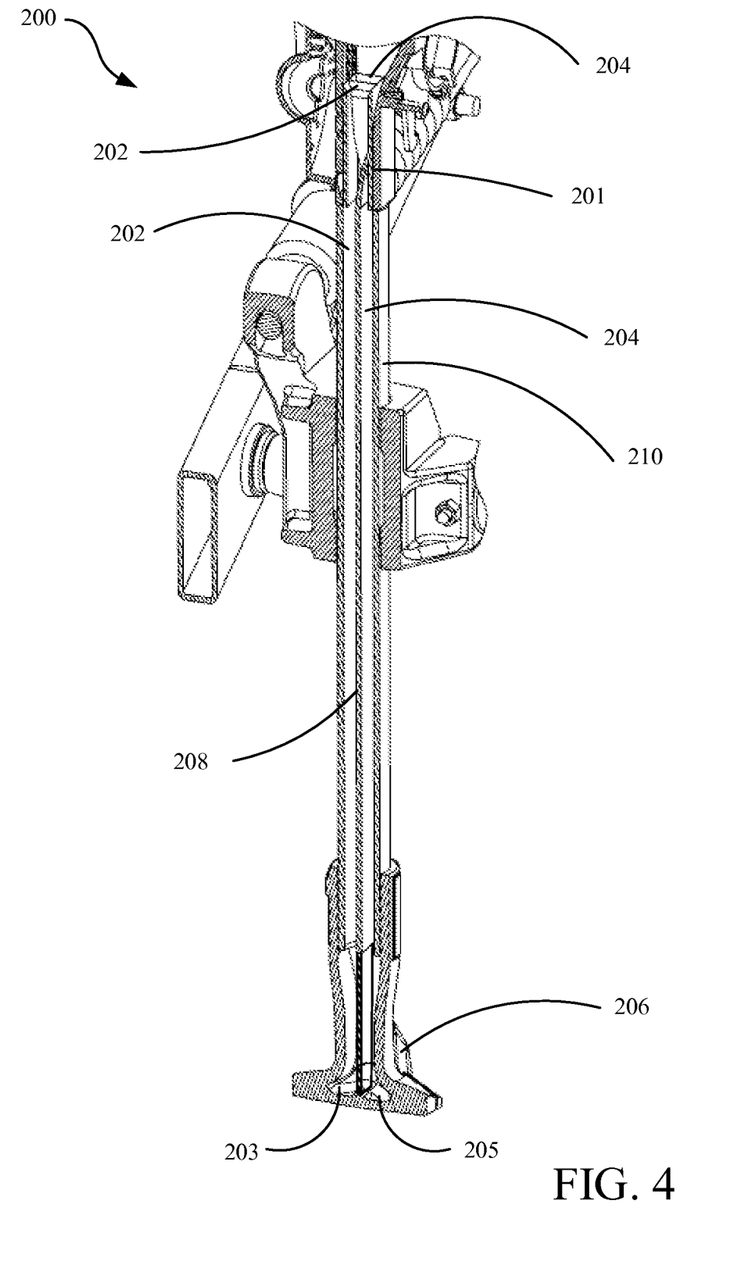
FIG. 4 is a cross-sectional view of one example of a multi-channel seed delivery system.

FIG. 4 is a cross-sectional view of one example of a multi-channel seed delivery system 200. In one example, system 200 is illustratively coupled to and configured to receive seed from a seed metering system (such as system 102 shown in FIG. 1) at a connection 201. System 200 includes a first channel 202 providing a first seed stream path to a first seed row aperture 203 and a second channel 204 providing a second seed stream path to a second seed row aperture 205. While apertures 205 are illustratively formed on a paired row opener or other component 206, in one example channels 202 and 204 can be provided to separate endpoint components (e.g., separate trenches or separate components in the same trench).

Channels 202 and 204 are separated by a wall 208 extending along some or all of the length of channels 202 and 204. Wall 208 facilitates the maintenance of separate seed flow paths to apertures 203 and 205. In the illustrated example, channels 202 and 204 comprises a bifurcated tube 210, that is bifurcated by wall 208.

Figure 5:
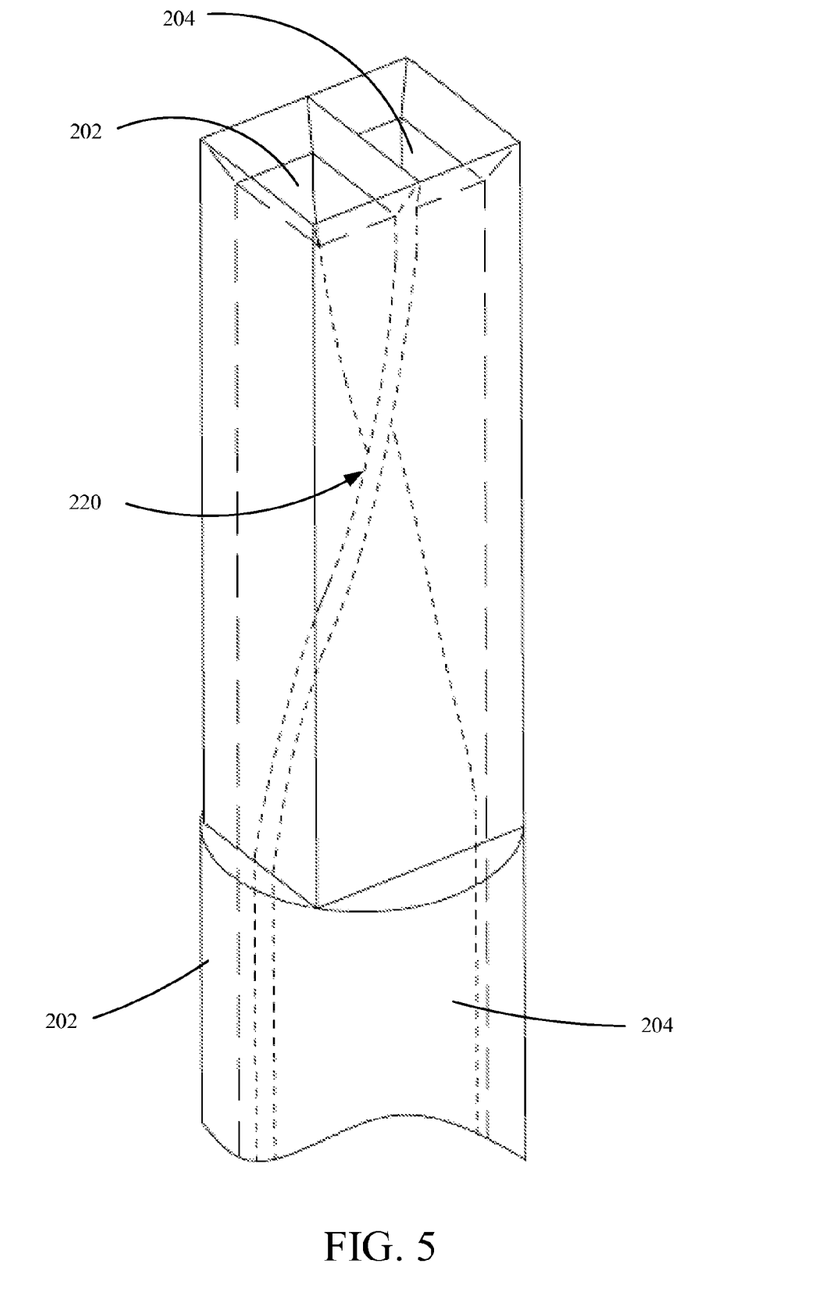
FIG. 5 is an enlarged view of a portion of FIG. 4.

FIG. 5 is an enlarged view of a portion of FIG. 4. As shown in FIG. 5, system 200 can comprises a helix 220 that rotates the orientation of channels 202 and 204 relative to component 206. That is, seed position at the outlet of the metering system may differ from that of the seed position at component 206. As such, helix 220 operates to rotate channels 202 and 204 (ninety degrees in the present example) to align the channels with the outlet apertures 203 and 205.

Figure 6A:
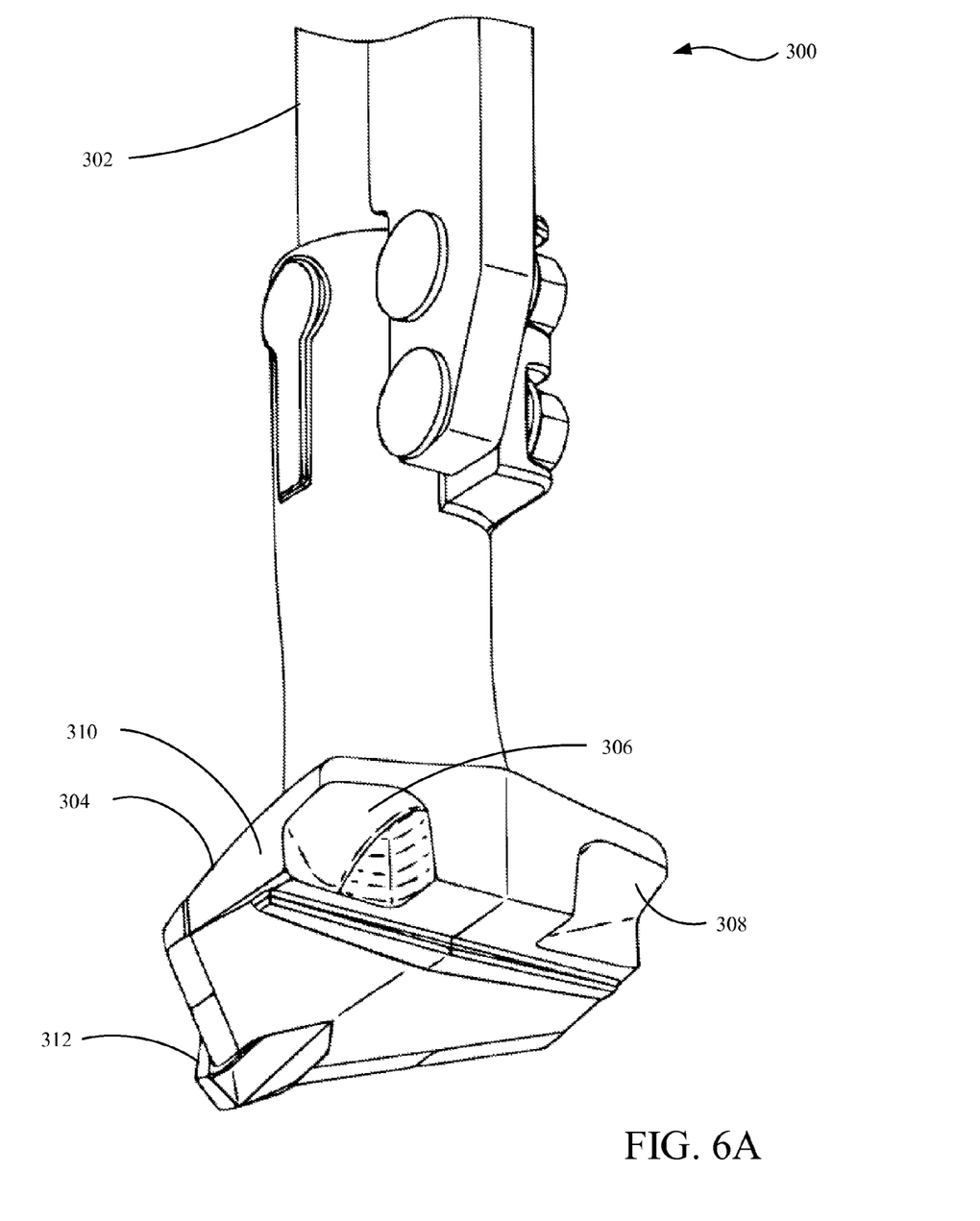
FIG. 6A illustrates one example of a paired row opener for a seed delivery system.

FIG. 6A illustrates one example of a paired row opener 300 for a delivery endpoint component, such as component 120 shown in FIG. 1. Opener 300 comprises a connection shaft 302 having a channel forming a seed delivery path to a pair of seed releasing orifices 306 and 308, formed in a head 310 mounted on shaft 302. A front 312 of opener 300 is configured to operate as a primary or secondary trench opener. That is, in one example, opener 300 is the primary trench opener that passes through un-trenched soil to form the trench in which seeds are released from orifices 306 and 308. In another example, opener 300 follows a primary trench opener. In this manner, the front 312 can act as a trench cleaner that can push soil out of the way in the preformed trench.

Figure 6B:
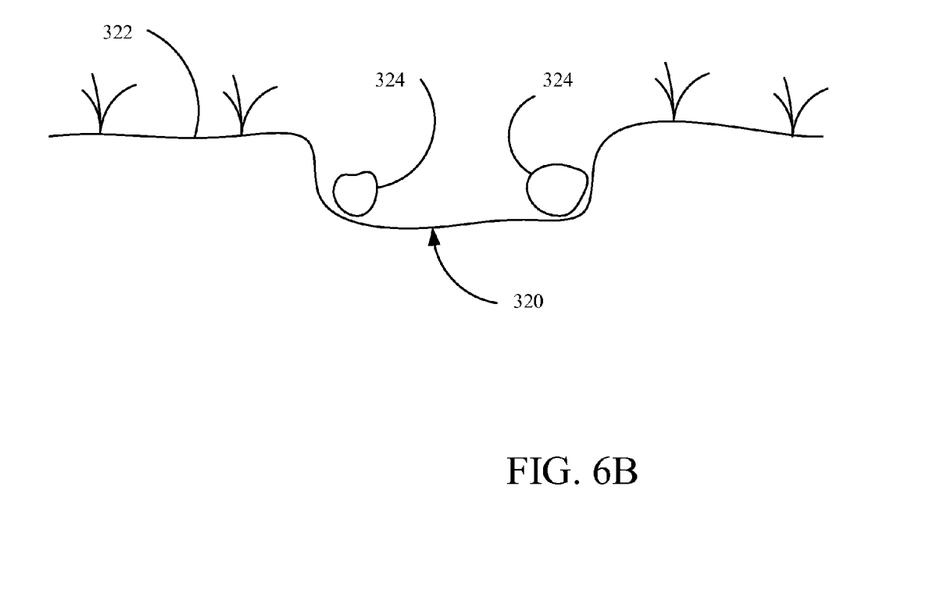
FIG. 6B illustrates one example of seed placement from the paired row opener shown in FIG. 6A.

FIG. 6B illustrates one example of seed placement from paired row opener 300. FIG. 6B is a cross-sectional view of a trench 320 formed in a terrain 322. A pair of seeds 324 are released by orifices 306 and 308 on opposing sides of trench 320.

One way to deliver seed to a paired row opener comprises volumetrically metering seed into a single stream that is split at the end point in a manner that is at least somewhat random. For instance, a dividing wall is provided within the opener, where one side of the wall conveys seed to a first orifice and the other side of the wall conveys seed to a second orifice. Due to the randomness of the seed position within the conveyance tube, the split between the two orifices is often not even (i.e., one orifice receives a greater flow of seeds than the other orifice, resulting in a high variability in the seed spacing).

In the illustrated example, opener 300 is configured for use with a singulating meter system configured to singulate seed into a plurality of separate delivery channels, such as system 102. As such, the meter singulates seed directly into separate channels that independently convey seed to each orifice 306 and 308, which can reduce seed spacing variation between rows.

It should also be noted that the different embodiments described herein can be combined in different ways. That is, parts of one or more embodiments can be combined with parts of one or more other embodiments. All of this is contemplated herein.

Example 1 is an agricultural seeding machine comprising a seed delivery system configured to deliver seeds to at least one trench by two or more substantially gravity-drop channels, and a seed metering system comprising a rotating meter element configured to singulate seeds from a seed source into the two or more channels.

Example 2 is the agricultural seeding machine of any or all previous examples, wherein the rotating meter element uses a pressure differential to singulate the seeds into the two or more channels.

Example 3 is the agricultural seeding machine of any or all previous examples, wherein the rotating meter element comprises at least a first set of apertures configured to singulate seed into a first one of the channels, and a second set of apertures configured to singulate seed into a second one of the channels.

Example 4 is the agricultural seeding machine of any or all previous examples, wherein the first and second sets of apertures are arranged on the rotating meter element annularly.

Example 5 is the agricultural seeding machine of any or all previous examples, wherein the rotating meter element comprises at least one of a substantially disk-like element, a concave-shaped element, or a drum.

Example 6 is the agricultural seeding machine of any or all previous examples, wherein the two or more substantially gravity-drop channels are configured to plant the seeds in at least a first seed row and a second seed row.

Example 7 is the agricultural seeding machine of any or all previous examples, wherein the first and second seed rows are spaced apart by a distance that is less than or equal to approximately twelve inches.

Example 8 is the agricultural seeding machine of any or all previous examples, wherein the seed delivery system comprises a bifurcated tube having a first channel and a second channel extending therethrough.

Example 9 is the agricultural seeding machine of any or all previous examples, wherein the bifurcated tube comprises a helix portion that rotates the first and second channels approximate ninety degrees to change an orientation of the first and second channels.

Example 10 is the agricultural seeding machine of any or all previous examples, wherein the first and second seed rows are planted in different spatial locations within a same trench using a paired row opener.

Example 11 is the agricultural seeding machine of any or all previous examples, wherein the seed metering system comprises a pressure differential component configured to apply a negative pressure to a side of the rotating meter element.

Example 12 is the agricultural seeding machine of any or all previous examples, wherein the seed metering system comprises a pressure differential component configured to deliver pressurized air to a housing of the seed metering system to pressurize one side of the rotating meter element with a positive pressure.

Example 13 is a metering system for an agricultural machine, comprising a substantially disk-shaped rotatable element having at least a first set of annular apertures and a second set of annular apertures formed thereon, and a drive mechanism configured to rotate the rotatable element to convey seeds from a pickup location to a release location, wherein wherein the first set of annular apertures is configured to singulate seed into a first delivery channel and the second set of annular apertures is configured to singulate seed into a second delivery channel.

Example 14 is the metering system of any or all previous examples, and further comprising a pressure differential component configured to apply a pressure differential to the rotatable element, wherein the pressure differential retains the seeds in apertures of the rotatable element between the pickup and release locations.

Example 15 is the metering system of any or all previous examples, wherein the first and second delivery channels comprise a bifurcated seed tube.

Example 16 is the metering system of any or all previous examples, wherein the first and second delivery channels deliver seed to different spatial locations within a same trench.

Example 17 is the metering system of any or all previous examples, wherein the bifurcated seed tube comprises a helix portion that rotates the first and second delivery channels approximate ninety degrees to change an orientation of the first and second delivery channels.

Example 18 is an agricultural seeding machine comprising a paired-row opener, a seed delivery system configured to deliver seeds to the paired-row opener using a plurality of separate delivery channels, and a seed metering system comprising a rotating meter element configured to singulate seeds from a seed source directly into the plurality of separate delivery channels.

Example 19 is the agricultural seeding machine of any or all previous examples, wherein the rotating meter element comprises a first set of annular apertures that singulate seed into a first one of the delivery channels and a second set of annular apertures that singulate seed into a second one of the delivery channels.

Example 20 is the agricultural seeding machine of any or all previous examples, wherein the rotating meter element comprises a rotating disk that uses a pressure differential to singulate the seeds, and the plurality of separate delivery channels are formed by a bifurcated seed tube.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural seeding machine comprising:
    a seed delivery system configured to deliver seeds to at least one trench by two or more substantially gravity-drop channels, wherein the two or more substantially gravity-drop channels are configured to plant the seeds in a east a first seed row and a second seed row; and
    a seed metering system comprising a rotating meter element configured to singulate seeds from a seed source into the two or more channels.

2. The agricultural seeding machine of claim 1, wherein the rotating meter element uses a pressure differential to singulate the seeds into the two or more channels.

3. The agricultural seeding machine of claim 1, wherein the rotating meter element comprises at least a first set of apertures configured to singulate seed into a first one of the channels, and a second set of apertures configured to singulate seed into a second one of the channels.

4. The agricultural seeding machine of claim, wherein the first and second sets of apertures are arranged on the rotating meter element annularly.

5. The agricultural seeding machine of claim 4, wherein the rotating meter element comprises at least one of a substantially disk-like element, a concave-shaped element, or a drum.

6. The agricultural seeding machine of claim 1, wherein the first and second seed rows are spaced apart by a distance that is less than or equal to approximately twelve inches.

7. The agricultural seeding machine of claim 6, wherein the seed delivery system comprises a bifurcated tube having a first channel and a second channel extending therethrough.

8. The agricultural seeding machine of claim 7, wherein the bifurcated tube comprises a helix portion that rotates the first and second channels approximate ninety degrees to change an orientation of the first and second channels.

9. The agricultural seeding machine of claim 1, wherein the and second seed rows are planted in different spatial locations within a same trench using a paired row opener.

10. The agricultural seeding machine of claim 1, wherein the seed metering system comprises a pressure differential component configured to apply a negative pressure to a side of the rotating meter element.

11. The agricultural seeding machine of claim 1, wherein the seed metering system comprises a pressure differential component configured to deliver pressurized air to a housing of the seed metering system to pressurize one side of the rotating meter element with a positive pressure.

12. A metering system for an agricultural machine, the metering system comprising:
    a substantially disk-shaped element having at east a first set of annual apertures and a second set of annular apertures formed thereon; and
    a drive mechanism configured to rotate the rotatable element to convey seeds from a pickup location to a release location;

wherein the first set of annular apertures is configured to singulate seed into a first delivery channel configured to plan seeds in a seed row and the second set of annular apertures is configured to singulate seed into a second delivery channel configured to plant seeds in a second seed row.

13. The metering system of claim 12, and further comprising:
a pressure differential component configured to apply a pressure differential to the rotatable element, wherein the pressure differential retains the seeds in apertures of the rotatable element between the pickup and release locations.

14. The metering system of claim 12, wherein the first and second delivery channels comprise a bifurcated seed tube.

15. The metering system of claim 14, wherein the first seed row and the second seed row are different spatial locations within a same trench.

16. The metering system of claim 15, wherein the bifurcated seed tube comprises a helix portion that rotates the first and second delivery channels approximate ninety degrees to change an orientation of the first and second delivery channels.

17. An agricultural seeding machine comprising:
a paired-row opener comprising a plurality of seed releasing orifices configured to release seeds in at least a first seed row d a second seed row;
a seed delivery system configured to deliver seeds to the plurality of seed releasing orifices using a plurality of separately delivery channels; and
a seed metering system comprising a rotating mete element configured to cingulate seeds from a seed source directly into the plurality of separate delivery channels.

18. The agricultural seeding machine of claim 17, wherein the rotating meter element comprises a first set of annular apertures that cingulate seed into a first one of the delivery channels and a second set of u a apertures that singulate seed into a second one of the delivery channels.

19. The agricultural seeding machine of claim 18, wherein the rotating meter element comprises a rotating disk that uses a pressure differential to singulate the seeds, and the plurality of separate delivery channels are formed by a bifurcated seed tube.

* * * * *